United States Patent
Elliott et al.

(10) Patent No.: US 10,358,156 B2
(45) Date of Patent: Jul. 23, 2019

(54) PALLET FOR TUBULAR DOWN-HOLE TOOLS

(71) Applicants: LouDana L. Elliott, Lufkin, TX (US); Earl J Elliott, Grapeland, TX (US)

(72) Inventors: LouDana L. Elliott, Lufkin, TX (US); Earl J Elliott, Grapeland, TX (US)

( * ) Notice: Subject to any disclaimer, the term of this patent is extended or adjusted under 35 U.S.C. 154(b) by 0 days.

(21) Appl. No.: 15/584,623

(22) Filed: May 2, 2017

(65) Prior Publication Data
US 2017/0232991 A1   Aug. 17, 2017

Related U.S. Application Data

(62) Division of application No. 14/795,690, filed on Jul. 9, 2015, now Pat. No. 9,669,855.

(51) Int. Cl.
| | |
|---|---|
| *B62B 1/00* | (2006.01) |
| *B62B 3/10* | (2006.01) |
| *B62B 3/02* | (2006.01) |
| *B62B 1/26* | (2006.01) |
| *B62B 3/00* | (2006.01) |

(Continued)

(52) U.S. Cl.
CPC .............. *B62B 3/104* (2013.01); *B62B 1/002* (2013.01); *B62B 1/004* (2013.01); *B62B 1/12* (2013.01); *B62B 1/262* (2013.01); *B62B 3/001* (2013.01); *B62B 3/02* (2013.01); *B62B 3/0618* (2013.01); *B62B 3/102* (2013.01); *B62B 5/0086* (2013.01);

(Continued)

(58) Field of Classification Search
CPC .. B62B 3/00; B62B 3/104; B62B 3/02; B62B 3/002; B62B 3/005; B62B 3/001; B62B 3/102; B62B 3/04; B62B 3/10; B62B 5/0086; B62B 5/06; B62B 5/0089; B62B 5/0079; B62B 5/0083; B62B 19/02; B62B 19/00; B62B 19/04; B62B 13/02; B62B 13/00; B62B 13/06; B62B 13/16; B62B 13/18; B62B 1/12; B62B 1/002; B62B 1/262; B62B 1/004; B62B 1/22; B62B 1/20

See application file for complete search history.

(56) References Cited

U.S. PATENT DOCUMENTS

| | | | |
|---|---|---|---|
| 2,624,483 A | * | 1/1953 | Ketzel ..................... B62B 3/104 248/129 |
| 4,202,653 A | | 5/1980 | Moller |

(Continued)

*Primary Examiner* — James M Dolak
(74) *Attorney, Agent, or Firm* — Law Office of Jeff Williams PLLC; J. Oliver Williams

(57) ABSTRACT

A pallet is provided for supporting cylinders. The pallet can have a convex spine extending substantially the length of the pallet in a longitudinal direction, having a backstop at a first end. The pallet has one or more trays attached transverse to the convex spine, each tray having longitudinal fluted indents to restrain a cylinder from rolling transverse, the longitudinal fluted indents are each arranged to accept a cylinder from above. The pallet has a left outrigger attached and extending transverse to the convex spine, the left outrigger stabilizing the pallet with respect to terrain, as well as a right outrigger attached and extending transverse to the convex spine, the right outrigger stabilizing the pallet with respect to terrain. The pallet can have a coupling extending from an end of the convex spine, wherein the coupling is arranged to take a crane hook in engagement to pull the pallet.

8 Claims, 7 Drawing Sheets

(51) Int. Cl.
   *B62B 5/06*   (2006.01)
   *B62B 3/06*   (2006.01)
   *B62B 5/00*   (2006.01)
   *B62B 19/02*  (2006.01)
   *B62B 1/12*   (2006.01)

(52) U.S. Cl.
   CPC ............... *B62B 5/06* (2013.01); *B62B 19/02* (2013.01); *B62B 2207/02* (2013.01)

(56) References Cited

U.S. PATENT DOCUMENTS

| | | | |
|---|---|---|---|
| 4,501,402 A | 2/1985 | Saito et al. | |
| 5,180,178 A * | 1/1993 | Caceres | B62B 5/0093 280/47.34 |
| 5,490,465 A * | 2/1996 | Hoyt | B65D 19/0095 108/51.3 |
| 5,507,392 A * | 4/1996 | Schutz | B65D 19/10 206/599 |
| 6,026,958 A * | 2/2000 | Kelly | B65D 1/243 206/3 |
| 6,085,852 A | 7/2000 | Sparks | |
| 6,105,980 A * | 8/2000 | Cino | B62B 3/02 206/505 |
| 6,119,861 A | 9/2000 | Schneider | |
| 6,195,960 B1 | 3/2001 | Gjedebo | |
| 6,302,414 B1 * | 10/2001 | Berthiaume | B62B 1/002 280/47.18 |
| 6,851,563 B1 * | 2/2005 | Lipari | A47F 7/283 211/59.4 |
| 7,195,257 B2 * | 3/2007 | Stoneback | B62B 3/104 280/280 |
| 7,328,923 B1 | 2/2008 | Urdiales | |
| 8,931,420 B2 * | 1/2015 | Larson | B62B 3/02 108/54.1 |
| 9,061,697 B2 * | 6/2015 | Veronie | B62B 3/10 |
| 9,701,441 B2 * | 7/2017 | Slaats | A47F 5/0018 |
| 9,944,448 B2 * | 4/2018 | Lopez | B62B 3/16 |
| 9,969,414 B2 * | 5/2018 | Kelly | B62B 3/005 |
| 10,124,822 B2 * | 11/2018 | Nielsen | B62B 5/0079 |
| 2005/0104394 A1 | 5/2005 | Cortez | |
| 2014/0219770 A1 | 8/2014 | Veronie et al. | |
| 2014/0300070 A1 | 10/2014 | Perrault et al. | |

* cited by examiner

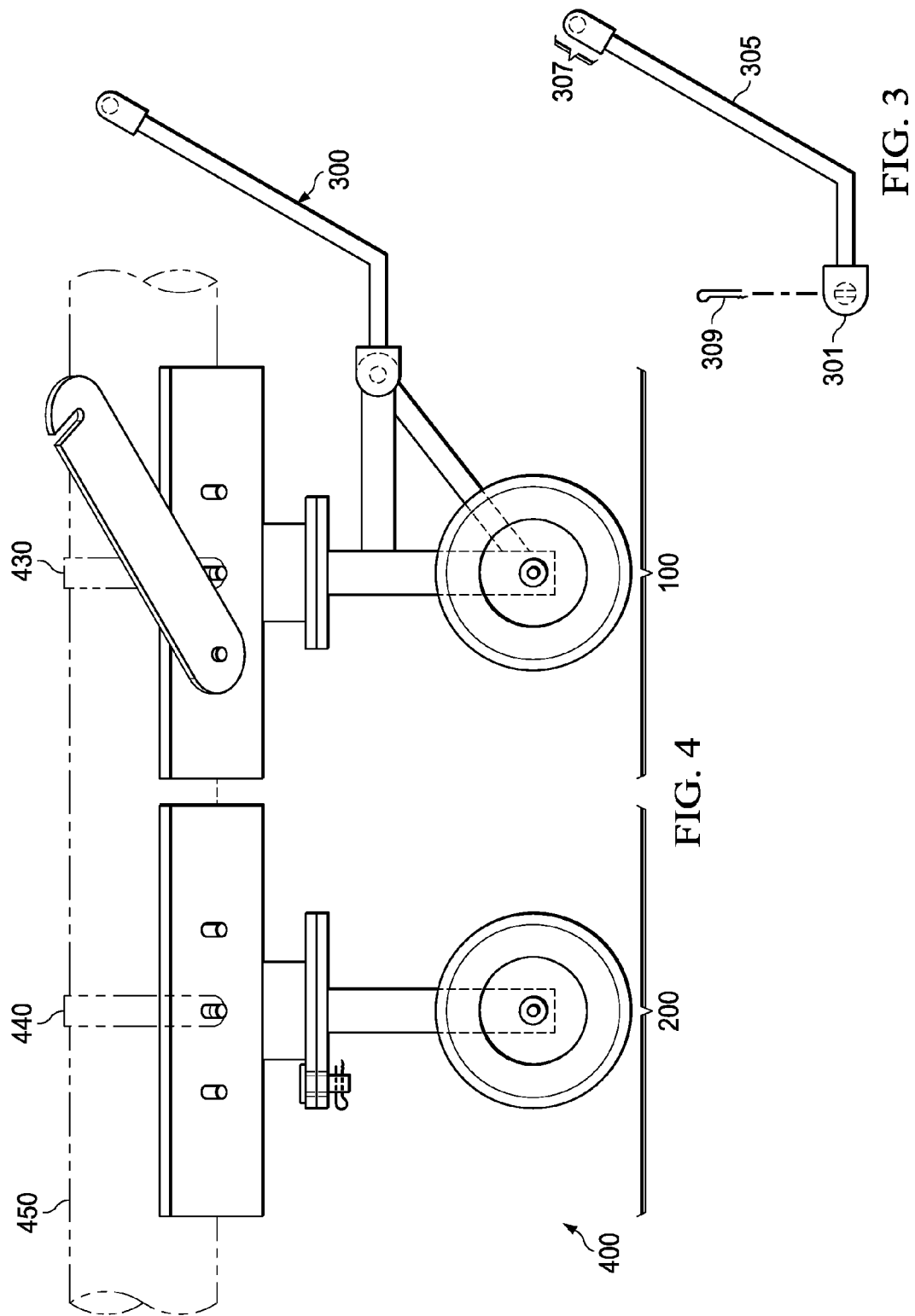

PALLET FOR TUBULAR DOWN-HOLE TOOLS

The present invention is a divisional to parent patent application Ser. No. 14/795,690, filed on Jul. 9, 2015, entitled "Pallet for Tubular Down-Hole Tools", priority to which is claimed. The present invention relates to transport and positioning of oilfield equipment and more specifically to delivering and retrieving from an operating drill-site, down-hole tools.

BACKGROUND

Measurement while drilling (MWD) involves evaluating the physical properties of the well environment in three-dimensional space while extending a wellbore. To obtain the necessary measurements, several down-hole tools are used by adding them to the drill string, and subsequently retrieving them for re-use at other drill sites. Examples of these down-hole tools include mud pulse tools and electromagnetic tools. Each of these devices are housed, at least in part, in cylindrical shapes, and in some instances, can be broken down to shorter segments for easier handling around the drill site.

These tools can be heavy and difficult to carry, particularly in the environment where the terrain is uneven, and occasionally slippery. In addition, since the tools need to be elevated to the operating floor of the drill platform, the tools need to be raised 25 feet or more above the surrounding terrain. This movement is facilitated by either carrying the tool, or tool parts, up flights of stairs, or by reliance on a crane to hoist the assembled tool string to the operating floor.

Mining in general, and drill sites in particular, are environments where injuries occur. In addition, staffing can be complicated if significant numbers of jobs require heavy lifting. Accordingly, it can be useful to alleviate these difficulties.

SUMMARY

According to one embodiment of the present invention, a pallet is provided for supporting cylinders. The pallet can have a convex spine extending substantially the length of the pallet in a longitudinal direction, having a backstop at a first end. The pallet may have at least two trays attached transverse to the convex spine, each tray having longitudinal fluted indents to restrain a cylinder from rolling transverse, the longitudinal fluted indents are each arranged to accept a cylinder from above. The pallet may have a left outrigger attached and extending transverse to the convex spine, the left outrigger stabilizing the pallet with respect to terrain, as well as a right outrigger attached and extending transverse to the convex spine, the right outrigger stabilizing the pallet with respect to terrain. The pallet can have a coupling extending from a second end of the convex spine, wherein the coupling is arranged to take a crane hook in engagement to pull the pallet.

BRIEF DESCRIPTION OF THE DRAWINGS

FIG. 3 is a side view of a handle and locking cotter-pin in accordance with an embodiment of the invention;

FIG. 4 is a side elevation view of a cart assembly in accordance with an embodiment of the invention;

DETAILED DESCRIPTION

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, when an item is attached to another item, such attaching can be via welds, screws, spacers and the like. Accordingly, additional material may be interposed between the two items, and still the two items may be described as 'attached' to each other.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more of the embodiments may be used to move specialized down-hole equipment to the operating rig and at the operating floor of the rig. For example, in some cases, cylindrical down-hole tool parts may be carted across terrain to manage delivery of the tool from highway to rig. In other cases, the down-hole tools may be carried, for example, within a pallet, through the use of a crane. Moreover, in such a configuration, the tool(s) can be re-oriented from horizontal and amenable to ground transport, to a vertical position desirable at the operating floor of the rig, for example, near the turntable. As such, efficiencies in flexible assignment of personnel to move the equipment can be achieved, while potentially reducing workplace injuries, as compared to the prior art.

Figure 1A:
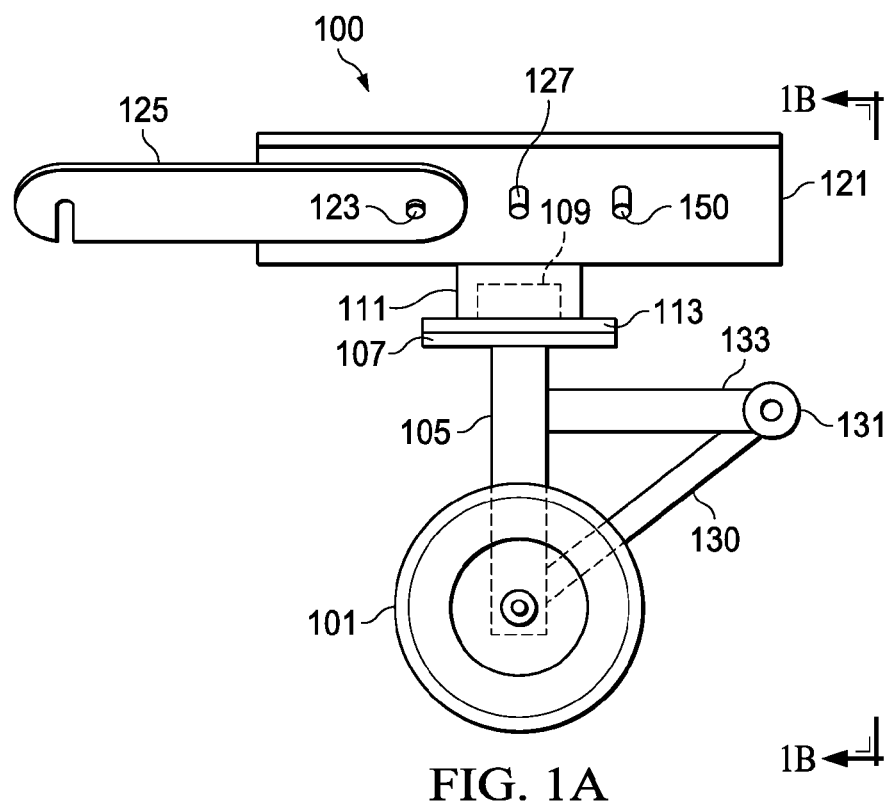
FIG. 1A is a side elevation view of a lead cart in accordance with an embodiment of the invention.

FIG. 1A is a side elevation view of a lead cart in accordance with an embodiment of the invention. A pair of wheels forms the base of lead cart 100. Lead cart 100 can be attached to a handle to provide a pulling force to any transported tools. (See FIG. 3). Right wheel 101 is paired to left wheel 102 (See FIG. 1B) to support transverse support 105 that rests on one or more axles. Transverse support 105 supports a structure that can resemble a top hat, namely, annular ring 107 and stationary dome 109. Together, annular ring 107 and stationary dome 109 may form an undergirding support to a further apparatus that can be pivoted in the direction of a towing handle. This further apparatus can take the form of movable dome 111 and movable annular ring 123. Movable dome 111 and movable annular ring 123 are rigidly attached to each other, but may pivot, as required, atop and about a co-axial vertical axis, that descends through a disk (not shown) at the top of movable dome 111, and stationary dome 109. Domes 109 and 111 may be dome-shaped. Alternatively, and as pictured at FIG. 1A, the dome can be a cylinder, arranged along a vertical axis with or without a circular cap of material closing a top end of the cylinder. In the role of allowing for steering, the stationary dome can operate as a pivot-mount. A pivot-mount allows changing the heading of the overall cart. In contrast, a trailer cart, depicted at FIGS. 2A and 2B can have its stationary dome lock the respective movable dome.

A concave support, for example, longitudinal angle iron 121 may be placed near or on top of the movable dome 111. Longitudinal angle iron 121 may extend, for example, 24 inches and serve as a surface that cylindrical tools may be placed upon. Many alternative forms of the concave support may be used in alternative embodiments. Concave support can provide support to the convex surfaces of, for example, a cylindrical tool. In addition, the concave support can provide support to a correspondingly convex member as might be present in pallet 500, of FIG. 5, below.

Annular ring 107 may be attached to a handle tube 131 that can be used to provide pulling and steering forces. Handle tube, may admit a transversely placed member that extends at a distal end from a handle (not shown), that may be removed for storage. See FIG. 3, below, for more details concerning handle 300. In an alternative configuration, the handle tube 131 can be attached to the transverse support 105. Transverse support 105 can be pulled by an attached tongue 130 that draws the assembly from axle 130. The tongue can permit a handle extension (not shown) to be attached via handle coupling 131. Tongue 105 can include right handle brace 133 and left handle brace 135 which connect the body of tongue 130 to a right vertical part of transverse support 105 and left vertical part of transverse support 105, respectively. Some embodiments may provide a more direct connection of each handle brace to the axle.

Longitudinal angle iron 121 may provide two further linking features. For tools that exceed four feet in length, it can be advantageous to provide a secondary set of wheels under the tool. Accordingly, longitudinal coupling 125 may be placed in pivoting arrangement to swing about coupling stud 123 which may secure longitudinal coupling 125 in a pivoting arrangement with a distal flange. Longitudinal coupling 125 may extend over two feet to latch or otherwise connect a secondary cart, for example, trailer cart 200 of FIGS. 2A and 2B, below. Alternatively, the longitudinal coupling may be latched to connect to an intermediate version of trailer cart 200 attaching via forward coupling stud 251, except that, in addition to the parts of trailer cart 200, (e.g. of FIG. 2A), the intermediate version of the trailer cart has an additional longitudinal coupling modeled after, for example, FIG. 1A coupling 125, to form a further linkage to a rearward trailer cart. Longitudinal coupling 125 is shown in its orientation suitable for connecting to a second cart, and has a slot, sufficiently wide to slide over a coupling post on such trailer cart, or alternatively, lead cart 100. Longitudinal coupling 125, as shown, is affixed to coupling stud 123 which penetrates a hole in longitudinal coupling 125. Alternatively, the longitudinal coupling may provide a notch that can engage the coupling stud 123, thus making the coupling entirely removable from the assembly and available for addition as the circumstances warrant in the field.

Figure 1B:
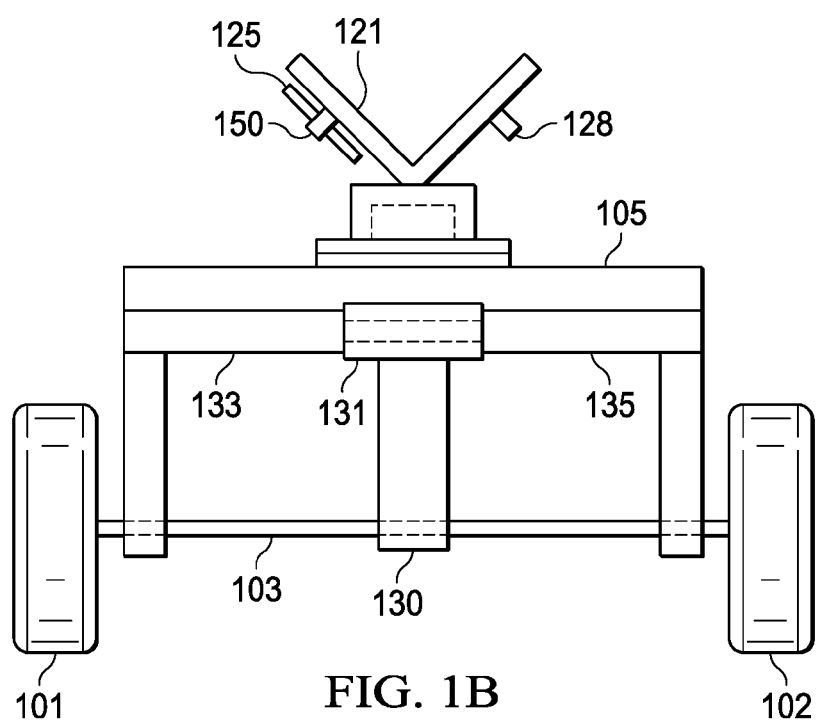
FIG. 1B is a front elevation view of a lead cart in accordance with an embodiment of the invention.

FIG. 1B is a front elevation view of a lead cart in accordance with an embodiment of the invention. This view is from the direction of a technician who pulls the lead cart. Accordingly, the left and right sides may be reversed, as compared to the typical direction of travel, namely, the direction of the handle tube. Visible in this view, is left wheel 102. A single axle 103 may be used to support both wheels. Alternatively, each wheel may mount on an independent axles. Right tie-down post 127 is ahead of coupling stud 123. Left tie-down post 128 can be on a generally opposing side of the longitudinal angle iron 121. These posts may cooperate with webbing, bungee cords, rubber straps (not shown) and the like to tie off the load to make it resistant from being dislodged by rough movement across the terrain. Longitudinal angle iron 121 may be attached using weld joints to movable dome 111.

Alternative tool-securing means are depicted as pallet 500 in FIGS. 5A-5C, below.

Figure 2A:
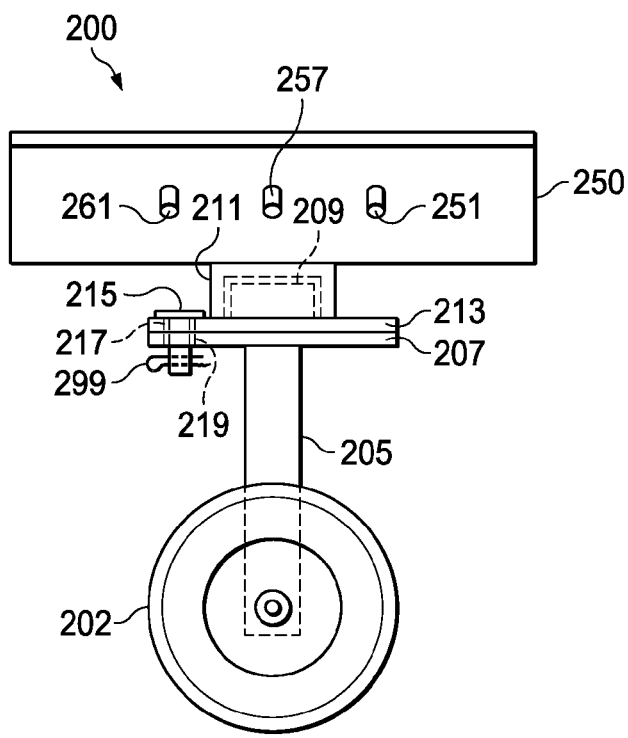
FIG. 2A is a side elevation view of a trailer cart and locking cotter pin in accordance with an embodiment of the invention

FIG. 2A is a side elevation view of a trailer cart and locking cotter pin in accordance with an embodiment of the invention. Trailer cart 200 is similar to lead cart in many respects. Both rely on wheels to move the load in a longitudinal direction. Both may provide concave longitudinal angle irons. However, unlike the lead cart, trailer cart 200 may provide coupling post 251 in order to matingly engage to longitudinal coupling 125 of FIG. 1A. As such, trailer cart 200 and lead cart 100, of FIG. 1 can be latched or otherwise secured together to provide dual supporting longitudinal angle irons. See FIG. 7, for details about a situation where each trailer is coupled with the longitudinal coupling 125.

Trailer cart 200 thus has the following features. Left wheel 201 and right wheel 202 support transverse support 205 via one or more axles. Transverse support 205 supports annular ring 207 and stationary dome 209. Stationary dome may have two co-linear holes that penetrate horizontally through the stationary dome 209 so as to admit a cotter pin, or other elongated device.

On top of the combined annular ring 207 and stationary dome 209 may be placed stationary annular ring 213 which can be welded to lockable dome 211. Lockable dome 211 is wider than stationary dome 209 and can be placed over stationary dome 209 so that corresponding collinear hole 217 may align with hole 219 of the stationary dome 209. In this configuration, locking pin 215 may be inserted to lock lockable dome 211 and stationary annular ring 213 to stationary dome 209 and annular ring 207 to prevent the two assemblies from rotating or otherwise detaching from each other. Cotter pin 299 may be inserted into hole 295 of locking pin 215.

Fastened to lockable dome 211 may be a concave and longitudinal support, for example, longitudinal angle iron 250. Longitudinal angle iron 250 may extend 24 inches, and provide added support to cylindrical tools placed atop the combined assembly. On one of the angled outer surfaces of the angle iron is coupling post 251. Behind coupling post, can be a further tie-down post 257. In addition, and for use in situations where three or more trailers are required to support a tool, a third rear coupling post 261 is provided. Each coupling post may have a flange on a distal end, in order to secure a longitudinal coupling, or a coupling bar to remain securely fastened. For each additional trailer cart, a coupling bar that has a notch at each end (not shown) can attach a rear coupling post of a forward trailer cart to a front coupling post, e.g., coupling post 251 of a trailer that follows behind the forward trailer cart.

Figure 2B:
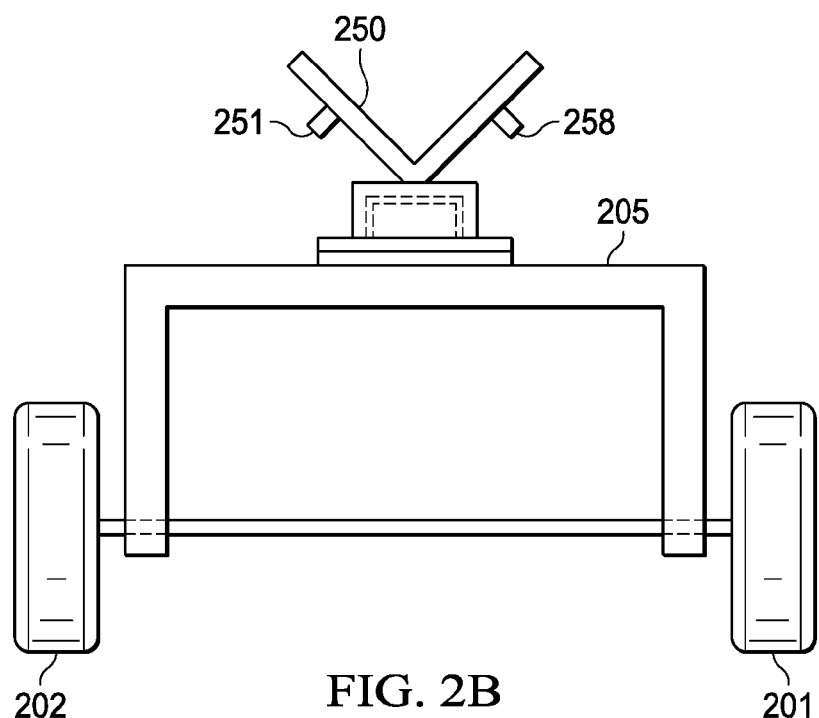
FIG. 2B is a front elevation view of a trailer cart and locking cotter pin in accordance with an embodiment of the invention.

FIG. 2B is a front elevation view of trailer cart 200 and locking cotter pin in accordance with an embodiment of the invention. A further tie-down post 258 is present on the left-hand side of trailer cart 200. The trailer cart is shown when viewed from the front—accordingly, the left-hand side of the trailer appears on the right of this diagram. Additional features can include wheel axle 203. Longitudinal angle iron 250 may be attached using weld joints to lockable dome 211.

FIG. 3 is a side view of a handle and locking cotter-pin in accordance with an embodiment of the invention. Handle 300 may be used to provide a pulling force to the lead cart 100 and trailer cart 200 of FIGS. 1A and 2A, respectively. Male handle coupling 301 can provide a horizontal cylinder that is insertable to handle tube 131 of FIG. 1A. Handle tube may permit vertical swiveling of the handle, while permitting transmission of a torque in a yaw direction to the lower cart wheels.

Handle 300 may include a hole 311 through a tip or distal part of the male handle coupling such that after inserting the male handle coupling through the handle tube 131 of FIG. 1A, a cotter pin 309, or other locking device, can keep the handle from dislodging from lead trailer 100. Additional parts of the handle include angled member 305 and eventually, grasping structure 307. Grasping structure 307 may provide an opening and a suitable gripping surface for a hand.

Cotter pins 309 (of FIG. 3) and 299 (of FIG. 2A) and locking pin 215 (of FIG. 2A) can be loosely attached to the core structure of their respective handle or cart embodiments through the use of light chain or other tether so as to avoid the potential loss of the pins in the rough terrain that surrounds drilling rigs. In other words, at times that the cotter pins do not operate in their function to lock or attach one part to another, they may dangle loosely on a part, during shipment and/or storage, via their respective tethers. Alternative embodiments may use, for temporary attachment, one or more spring-loaded pins that are recessed within a tubular structure of one part, and may be pressed by finger-strength into the recessed position. Such spring-loaded pins, can extend, absent the operation of finger-strength forces when the spring-loaded pin aligns to a corresponding hole in the surrounding structure of the part that is to be joined, for the moment, to the first part. In such an extended position, the pin operates as a detent, with respect to a hole of similar diameter as the pin, that is placed in the aligned and locked position.

FIG. 4 is a side elevation view of a cart assembly in accordance with an embodiment of the invention. Cart assembly 400 can include handle 300 of FIG. 3, lead cart 100 of FIG. 1, and trailer cart 200 of FIG. 2. Shown in dashed lines are the work-piece and tie downs that may be interoperating with cart assembly 400. Tie down 430 may attach via tie-down post 127 and tie-down post 128 of FIGS. 1A and 1B. Tie-down 440 may attach via tie-down post 257 and 258 of FIGS. 2A and 2B. Tool 450 can rest atop each of the carts, and thereby be steered through the use of handle 300. Carts 200 and 300 can be placed at varying distances from each other, particularly to suit the size and rigidity of tools that they may carry. For example, for a tool that is ten feet or more in length, a substantial gap between the respective angle irons of each cart may be so much that an technician uses the rigidity of the tool to form a tying framework between the carts, through the use of tie-downs 440 and 430. Longitudinal coupling can be folded for storage and unused in this situation, where the tool is relatively long, such as, for example, a mud pulse tool.

Figure 5A:
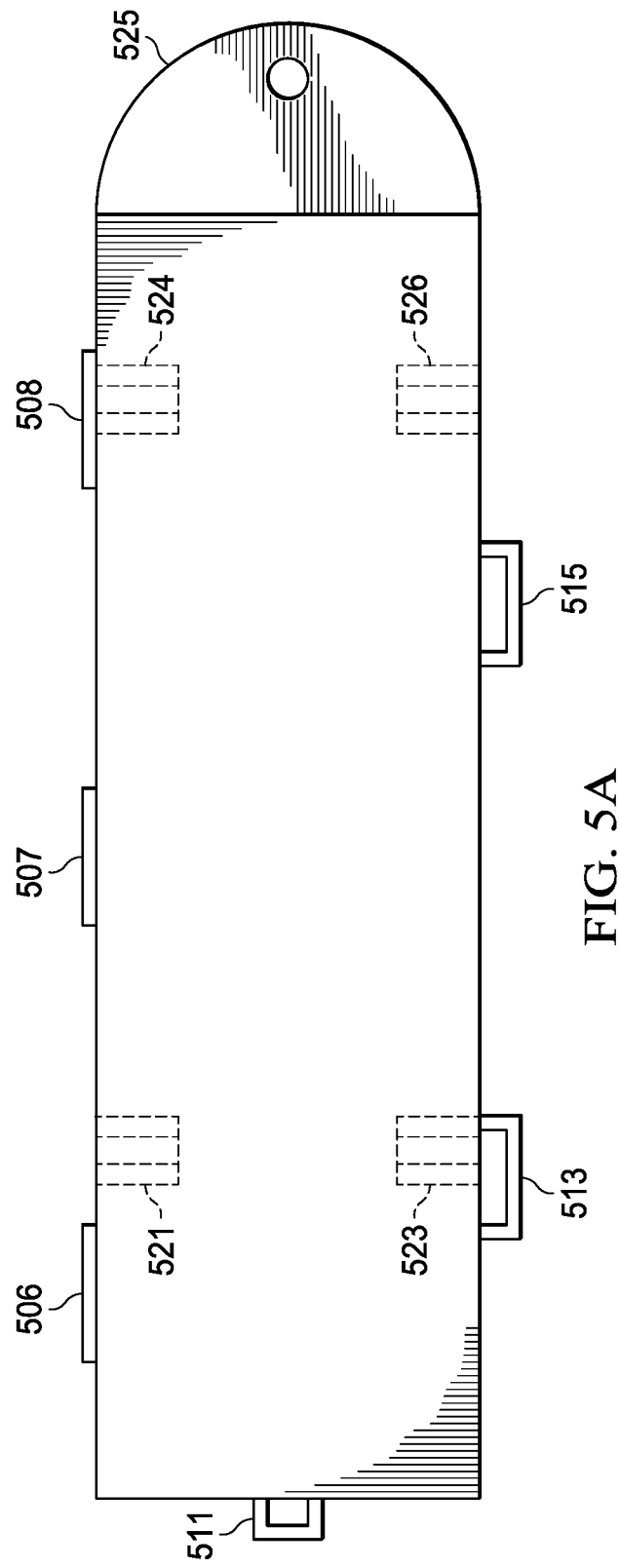
FIG. 5A is a top view of a pallet in accordance with an embodiment of the invention.

FIG. 5A is a top view of a pallet in accordance with an embodiment of the invention. Pallet 500 is shown in a horizontal position, which is a typical position it would be in during ground transport to and from the rig location from a delivery truck. Pallet 500 is designed to cooperate with cart assembly 400 shown, above, in FIG. 4. Longitudinal spine 505, left outrigger 521 and right outrigger 523 can be engaged to key surfaces of the cart assembly 400 to provide level support, as well as roll-stability to pallet 500. Further outriggers may provide support for use when the pallet 509 is placed on nearby terrain. Nevertheless, the outriggers in the front 524 and 526, will not engage to the transverse frame of a lead cart, e.g. of FIG. 1A transverse support 105. These outriggers may be left front outrigger 524 and right front outrigger 526. In other words, outriggers 524 and 526 may be placed forward of any swiveling transverse support, or alternatively, outriggers 524 and 526 may be made to have a lateral placement outside of the swiveling zone of any lead cart 100 placed below them.

Pallet 500 includes lid 501 which attaches to base 503 relying at least on hinges 506, 507 and 508. Referring to FIG. 5B, longitudinal spine 505 undergirds base 503 so that the pallet may be centered within the cart assembly. When open, pallet 500 can provide securing means for plural cylindrical tools—such as portions of an electromagnetic (EM) tool.

Figure 5B:
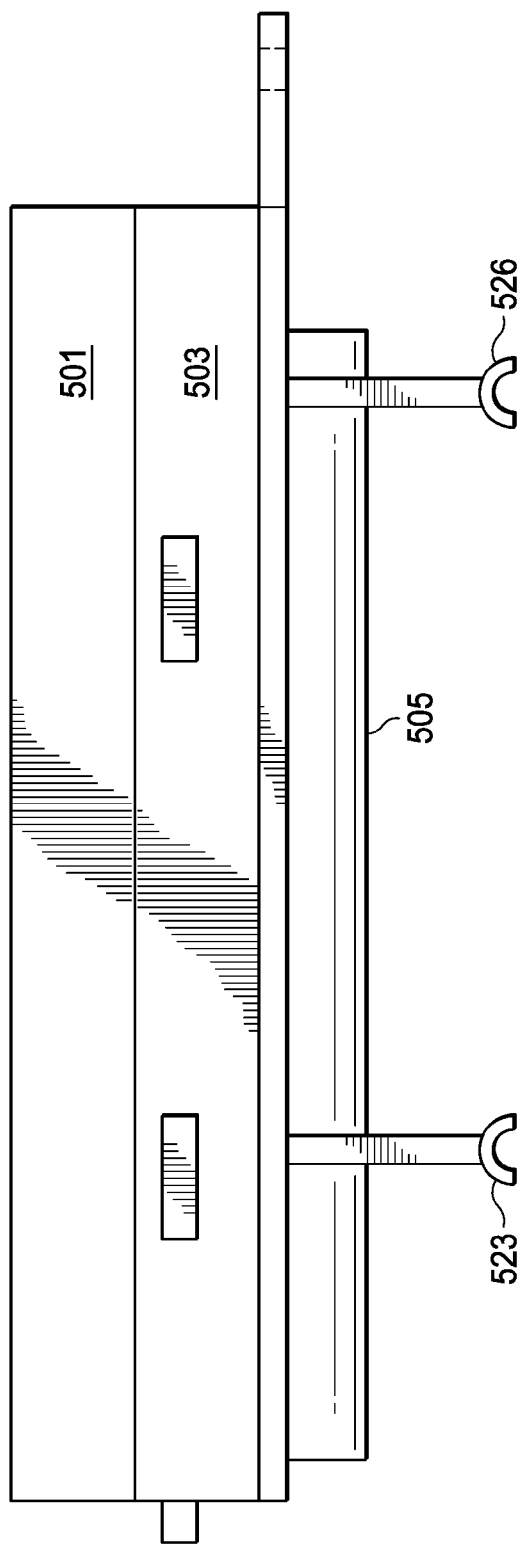
FIG. 5B is side elevation view of a pallet in accordance with an embodiment of the invention.
Figure 5C:
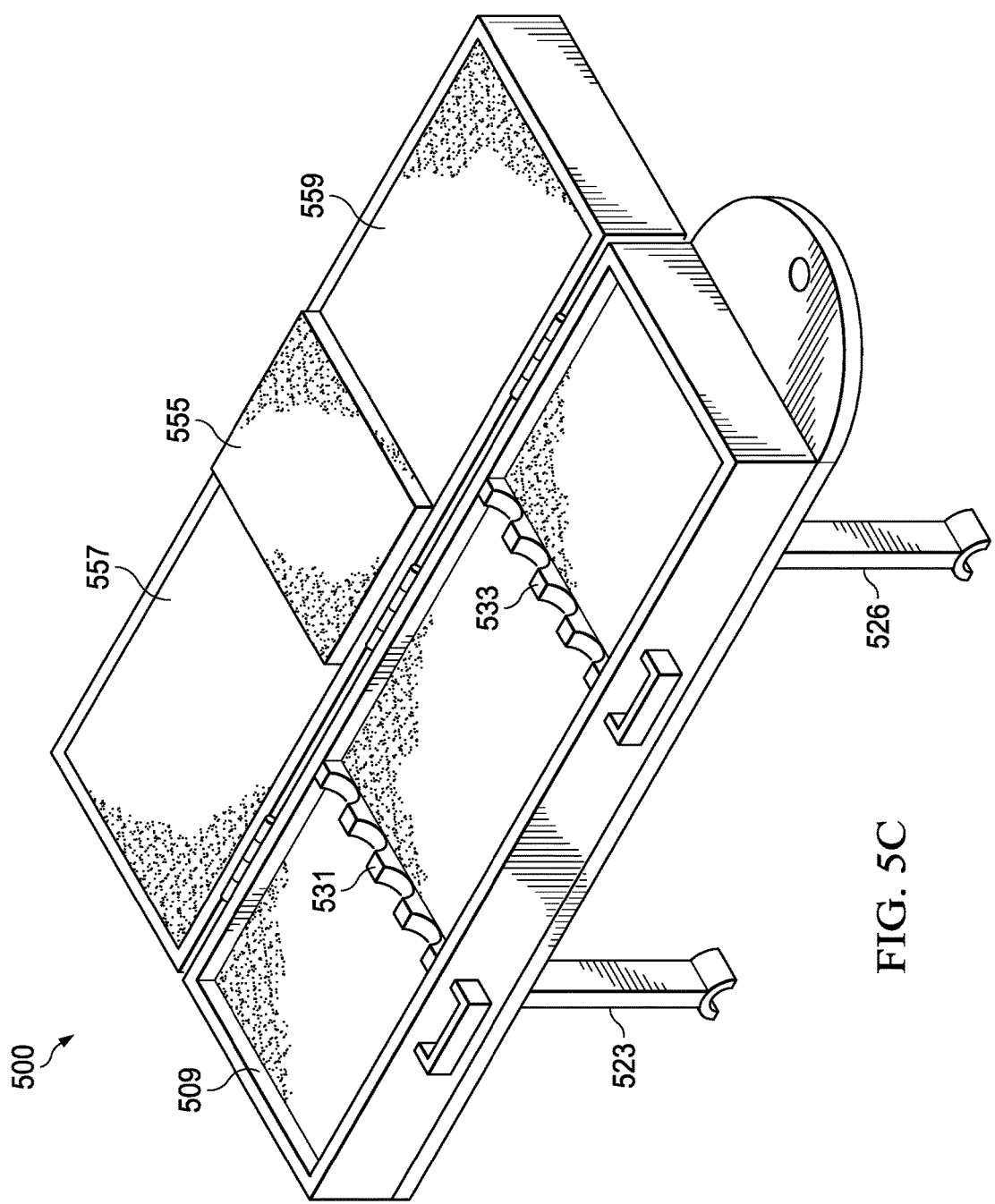
FIG. 5C is a perspective view of an open pallet in accordance with an embodiment of the invention.

Referring to FIG. 5C, inner parts to pallet 500 are shown. Fluted tray 531 can be supported by a floor of the pallet to present longitudinal indents provided to support multiple cylinders in parallel. The load from each cylinder, for example, a tool, can be further supported at fluted tray 533 which also presents longitudinal indents in a forward portion of pallet 500.

Alternative embodiments can include weather-resistant features. For example, the lower portion of pallet, may have a recessed lip that is at a higher elevation than an outer edge to the lip, while the lid to the pallet may have corresponding contours to close over the recessed lip. In other words, an outer lip of the lid overhangs at least an inner lip of the lower portion. Alternatively, the lower portion of the pallet may include a gasket that partially, or fully extends around the lip where the lid closes upon. Another alternative can include a tongue-in-groove arrangement that may permit a core vertical extension to extend up from a lip of the lower portion, to nest within a corresponding groove of the lid. Latches and lock mechanisms may further be added to limit travel of the lid away from the lower portion of the pallet.

Pallet 500 may be reoriented for lifting by a crane. Accordingly, backstop 509 can be placed at a rear portion to pallet 500, which then becomes a floor when the pallet 500 is hoisted from a coupling 525 at the front of pallet 500. The fluted indents of the trays can prevent lateral movement of tools placed therein. To aid in keeping the tools parallel and secure, lid 501 may have an upper cross-member 555 placed to provide a clasping surface to the tools, when the lid 501 is closed against base 503. The upper cross-member may be glued or otherwise attached to fill the shell of lid 501. Further, the upper cross-member may be made from a deformable material, such as polyurethane foam, to adapt to irregularly shaped objects that are placed into the pallet, such as mud pulse tools and EM tools. Residual support for cross-member 555 can be obtained through flush support 557 and flush support 559. Flush supports 557 and 559 can bulwark cross-member 555 and provide somewhat lighter pressure on the tools, once the lid is closed, as compared to cross-member 555. Conventional latches or other fastening means may be used to lock the lid against the base 503.

Guidance to the pallet 500 may be accomplished by grasping one of the side handles 513 and 515. Further lifting guidance can be available through rear handle 511. It is appreciated, that in some embodiments, a handle may be a mere cut-out in a surface to provide a hole wide-enough for grasping.

Longitudinal spine 505, undergirds base 503 and can extend substantially the length of pallet 500. Outriggers can be provided to give added support against rolling. These outriggers may connect in a tongue-and-groove arrangement to a transverse support of a cart, for example, trailer cart 200 of FIG. 2A. As such, an outrigger can terminate in an inverted U-shape so as to provide continuous engagement to the transverse support with minimal slippage. When longitudinal spine 505 is placed, for example, in the longitudinal angle iron of trailer cart 200, lateral placement of the pallet 500 may be fine-tuned until opening in left outrigger 521 seats with transverse support 205 entering within the arms of the U-shape. Similarly, right outrigger 523 may be also be placed in engagement to a right-side of transverse support 205 of trailer cart 200 of FIG. 2A. Accordingly, roll can be prevented in all but the steepest surfaces. Similarly, the pallet may be prevented from slipping longitudinally by the engagement of the outriggers to the trailer cart 200, even when pulling the assembly up-hill. Although the outriggers are shown with the U-shape in a squared form, it is appreciated that rounded U-shapes can be used, and a precise match to the cross-section of the transverse support is not strictly necessary, so long as the arms of the U-shape prevent substantial longitudinal shifting of the load by cooperating with the transverse support.

Sufficient clearance or tolerance in the U-shapes may be given to allow for easy placement, as well as some degree of pivoting of the pallet when lifted by a crane. As such, chafing and damage to the outriggers or to the transverse support may be minimized.

FIG. 5B is side elevation view of a pallet in accordance with an embodiment of the invention. Right outrigger 523 extends from base 503 below longitudinal spine 505. A transverse width between left outrigger (not shown) and right outrigger 523 may keep the combined outriggers at a width narrower than the inside distance between wheels 201 and 202 of FIGS. 2A and 2B, above.

FIG. 5C is a perspective view of an open pallet in accordance with an embodiment of the invention. A flange can extend from the front of pallet 500 through which a hole may extend vertically. Coupling 525 can be formed from the flange and its hole. It is appreciated that many alternative forms of eyelets or loops may be presented at the front of the pallet.

Figure 6:
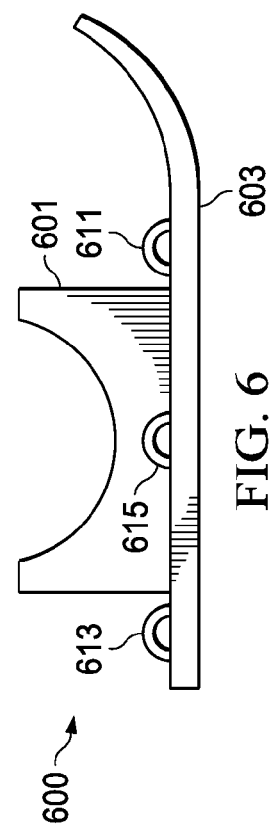
FIG. 6 is a ski attachment in accordance with an embodiment of the invention.

FIG. 6 is a ski or skid attachment in accordance with an embodiment of the invention. Ski 600 can provide a U-shaped wheel recess 601 having a similar diameter to wheels of either FIG. 1A or FIG. 2A. Supporting U-shaped wheel recess 601 is ski 603. Ski provides an upturned lip in the direction of intended travel, so as to part snow that may impede travel. Ski 601 can provide eyelets 611, 613 and 615 around its periphery so that a technician can loop webbing or bungee cords over a top of a wheel to keep the ski engaged over uneven surfaces.

Figure 7:
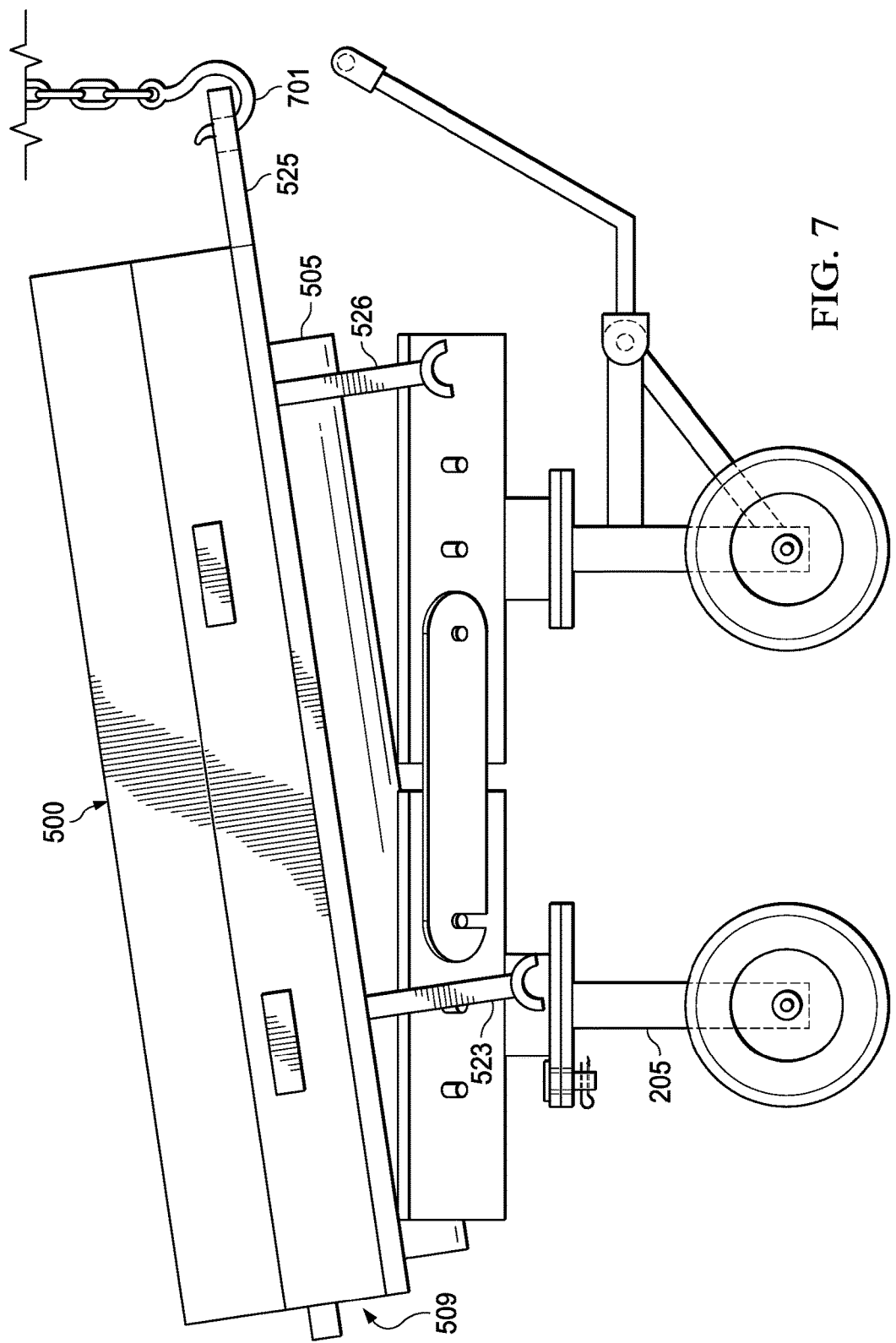
FIG. 7 is a side view of combined cart assembly and pallet, while the pallet is transitioning from being carried by the cart assembly to a hoisting attitude in accordance with an embodiment of the invention.

FIG. 7 is a side view of combined cart assembly and pallet, while the pallet is transitioning from being carried by the cart assembly to a hoisting attitude in accordance with an embodiment of the invention. Pallet 500 is in part, supported by hook 701 which enters via coupling 525. Longitudinal spine 505 remains partially engaged to longitudinal angle iron 250 of FIG. 2A.

Outrigger 523 may be loosely engaged to transverse support 205 as the outrigger lifts out of the transverse support. Tools placed within pallet 500 may shift backwards, and in turn, be supported by backstop 509. A padded cross-member may be of sufficient durability to accept minor shifting as the tools shift within pallet 500.

Accordingly, a system or kit of plural parts are provided that provide flexibility in an oilfield environment in transporting tools. One or more embodiments provide necessary roll and slide protection for one or more tools while moving over uneven surfaces. Depending on the type of tool, for example, the electromagnetic tool is frequently a multi-cylinder assembly, the tool can be moved from storage to the rig, and then conveniently elevated to the operating floor of the rig through the use of a pallet where it can be assembled.

Many of the embodiments may reduce lifting and carrying of the tools, and permit design of heavier tools for use at the rig. As such, when selecting workers, less attention may be paid to brawn, and more attention given to finesse and reliability. Further, by reducing the risk of injury, an oilfield operator may improve efficiency of oilfield operations. Additionally, every time a tool is not dropped, it can extend the useful life of the tool. A tool that is missing can be as much of a setback as a worker who is missing.

It is appreciated, that the plural carts, may be more rigidly and permanently fastened together, in some embodiments. Further, the wheels can be entirely replaced with skis in environments that exist in more-or-less permanently frigid conditions. Still further embodiments may have the handle permanently attached to at least the leading cart.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A pallet for supporting cylinders, the pallet comprising:
   a spine extending the length of the pallet in a longitudinal direction;
   at least one tray attached transverse to the spine, the at least one tray having longitudinal fluted indents to restrain a cylinder from rolling transverse, the longitudinal fluted indents each arranged to accept a cylinder from above;
   a horizontal base frame located underneath the at least one tray, between the spine and the at least one tray, the horizontal base frame having at least two longitudinal hinges at a lateral edge of the horizontal base frame, the at least one tray located within the base, the horizontal base having a backstop at a first end of the pallet;
   a securing lid mounted via the two longitudinal hinges, the securing lid arranged to rotate to a closed position in contact with the cylinder placed within the at least one tray;

a left outrigger attached and extending transverse to the spine, the left outrigger stabilizing the pallet with respect to terrain;

a right outrigger attached and extending transverse to the spine, the right outrigger stabilizing the pallet with respect to terrain; and a coupling extending from a second end of the spine, wherein the coupling is arranged to take a crane hook in engagement to pull the pallet;

wherein the spine is located beneath the horizontal base frame of the pallet, the at least one tray being located within the pallet.

2. The pallet of claim 1, wherein the spine is an angle iron having parallel longitudinal edges above a longitudinal crease, wherein each of the at least one tray is attached above the parallel longitudinal edges.

3. The pallet of claim 1, wherein the left outrigger is coupled to a supporting left wheel oriented to track longitudinally; and the right outrigger is coupled to a supporting right wheel oriented to track longitudinally.

4. The pallet of claim 3, wherein the supporting left wheel couples to the left outrigger via a tongue-and-groove mechanism, and the supporting right wheel couples to the right outrigger via a tongue-and-groove mechanism.

5. The pallet of claim 1, wherein the coupling comprises:
a horizontal flange at least one of the first end and the second end proximal to an end of the spine, and rigidly attached to the spine; and
a vertical hole through the horizontal flange, wherein the vertical hole comprises a diameter sufficient to admit a crane hook.

6. The pallet of claim 1, wherein the securing lid is padded so as to compress when the securing lid is closed so as to limit upward travel of an object placed upon the at least one tray.

7. The pallet of claim 1, wherein the left outrigger is coupled to a supporting left ski oriented to track longitudinally; and the left outrigger is coupled to a supporting right ski oriented to track longitudinally.

8. The pallet of claim 1, wherein the at least one tray attached transverse to the spine comprises at least two trays attached transverse to the spine, each tray having longitudinal fluted indents to restrain a cylinder from rolling transverse, the longitudinal fluted indents each arranged to accept a cylinder from above.

* * * * *